(12) United States Patent
Hendrix et al.

(10) Patent No.: US 7,035,101 B1
(45) Date of Patent: Apr. 25, 2006

(54) POWER SUPPLY ARCHITECTURE

(76) Inventors: A. Fred Hendrix, 4200 Dante Ct., Salida, CA (US) 95368; Chang-Pen Tai, 1175 Ranchero Way #27, San Jose, CA (US) 95117

( * ) Notice: Subject to any disclaimer, the term of this patent is extended or adjusted under 35 U.S.C. 154(b) by 16 days.

(21) Appl. No.: 10/810,059

(22) Filed: Mar. 26, 2004

(51) Int. Cl.
*H05K 7/20* (2006.01)

(52) U.S. Cl. ............... 361/695; 361/688; 361/690; 165/104.33; 165/122; 454/184

(58) Field of Classification Search ........... 361/677, 361/678, 687–690, 694–697, 719–721; 174/16.1, 174/16.3; 165/80.3, 104.33, 122
See application file for complete search history.

(56) References Cited

U.S. PATENT DOCUMENTS

| | | | | |
|---|---|---|---|---|
| 5,484,012 A | * | 1/1996 | Hiratsuka | 165/247 |
| 5,793,608 A | * | 8/1998 | Winick et al. | 361/695 |
| 5,926,367 A | * | 7/1999 | Gutierrez et al. | 361/695 |
| 6,031,717 A | * | 2/2000 | Baddour et al. | 361/687 |
| 6,087,800 A | * | 7/2000 | Becker et al. | 318/778 |
| 6,288,897 B1 | * | 9/2001 | Fritschle et al. | 361/687 |

* cited by examiner

*Primary Examiner*—Boris Chervinsky
(74) *Attorney, Agent, or Firm*—James E. Parsons

(57) ABSTRACT

A power supply is contained substantially within an enclosure of length, L. A first end of the enclosure has a first end wall containing an air intake port, with a second end of the enclosure having a second end wall containing an air exhaust port. An exterior wall surrounding the power supply is coupled to the first and second end walls so that substantially all air entering the power supply does so through the air intake port and all air leaving the power supply does so through the air exhaust port. The enclosure contains an airflow generator for inducing an air flow within the enclosure from the air intake port to the air exhaust port, located at least a distance L/5 from the air intake port and air exhaust port.

21 Claims, 10 Drawing Sheets

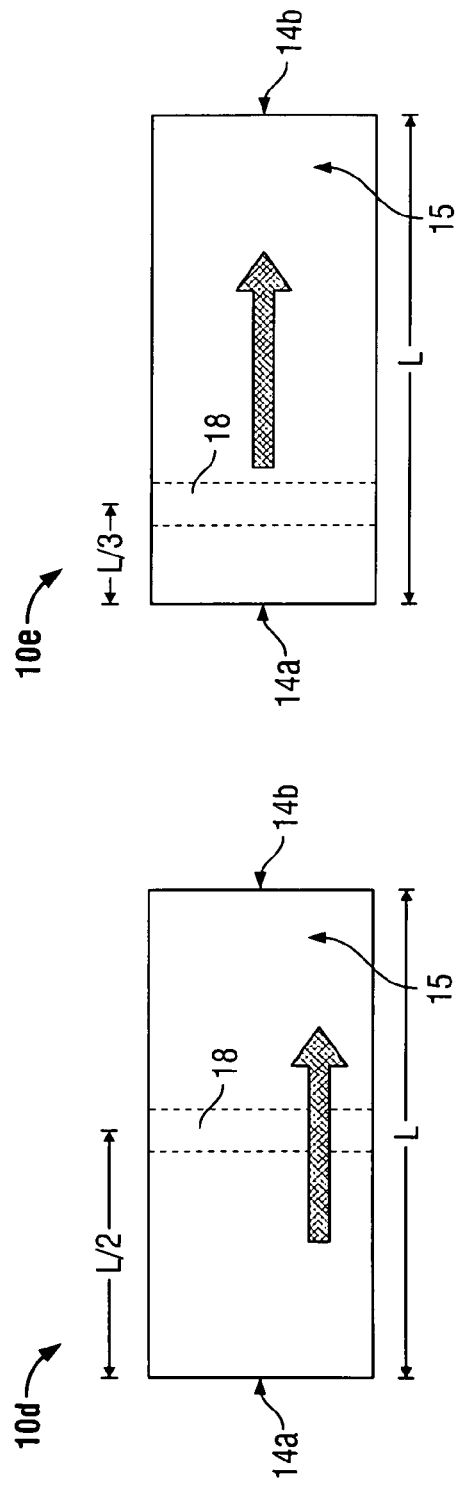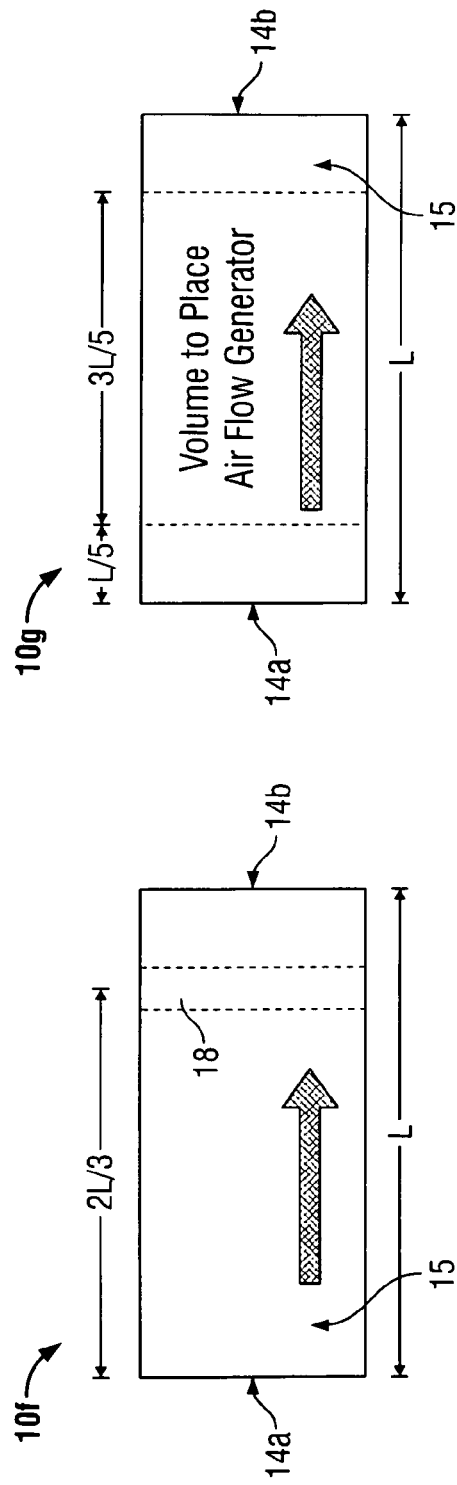

POWER SUPPLY ARCHITECTURE

FIELD OF THE INVENTION

The present invention is directed towards power supplies incorporating active cooling such as a fan or blower.

BACKGROUND OF THE ART

Many electronic systems, such as computer systems, need one or more power supplies for operation. In some such systems, the power supplies need to supply a large amount of power while minimizing the volume used to house the power supply components. Such power supplies often include a primary circuit interfacing with mains power and including a switching circuit to provide a source of a relatively high voltage, and a secondary circuit to convert the relatively high voltage into one or more relatively low voltage sources for powering circuitry. The power supply is generally enclosed in an enclosure having openings for air flow at its front and back.

Such power supplies often contain fans or blowers or other air flow generators located at one end of the structure housing the electric power components. These generators create a flux of air at the side of the structure having the generator.

Typically, the power supply electronic components generate relatively large amounts of heat in operation. These components are typically coupled to heat sinks in the power supply structure. As an airflow comes into contact with these heat sink structures, heat is transferred from the heat sink to the air. The air is then propelled out of the structure and into the environment, thus cooling the power supply.

The force imparted on the atmosphere at either end of the air flow generator tends to dissipate as the distance from the airflow generator increases due to thermodynamic and kinetic loss of energy in the flowing air. Accordingly, using a conventional architecture, a strong flow of air typically cannot be maintained throughout the power supply structure containing the power supply electronic components.

In some cases, the airflow generator is placed towards the "front" of the power supply unit. In such power supplies, the airflow at the "back" of the supply is reduced due to the kinetic energy loss of the airflow through the unit. In typical applications, an airflow generator creates a pressure differential at a particular location, resulting in an inflow into the generator and an outflow from the generator. The environmental impedance of the components within the enclosure produces an effective drop in the differential pressure created by the airflow generator. In the case described above, the airflow at the "back" is correspondingly reduced by the amount of the air flow impedance of the components and their heat sinks and other associated circuitry and parts disposed within the enclosure. The effective flow rate is the lesser of the rates at the opposing input and output ends with the effects of the air flow impedance of the components acting to reduce the pressure differential.

Accordingly, a lower airflow at an exhaust port may result in less heat per unit time being removed from the power supply. This limits the performance of the power supply. Greater air flow means that components can be run at higher power dissipation levels, the size of the power supply can be reduced, and/or performance can be increased.

In some cases, the airflow generator is placed towards the "back" of the power supply unit, e.g., near the exhaust port. In such power supplies, the airflow at the front end or intake port of the power supply can be reduced based on the kinetic energy loss of the airflow through the supply and on the increased impedance of the drop applied across the entire length of the enclosure. The increased impedance is reflected in a lower airflow. Accordingly, a lower exhaust airflow results in a lower intake airflow being drawn into the enclosure. Similar performance is reduced over what can be achieved with greater air flows.

Accordingly, an architecture for improving the performance of an air flow-cooled power supply would be desirable.

BRIEF DESCRIPTION OF INVENTION

A power supply is contained substantially within an enclosure of length, L. A first end of the enclosure has a first end wall containing an air intake port, with a second end of the enclosure having a second end wall containing an air exhaust port. An exterior wall surrounding the power supply is coupled to the first and second end walls so that substantially all air entering the power supply does so through the air intake port and all air leaving the power supply does so through the air exhaust port. The enclosure contains an airflow generator for inducing an air flow within the enclosure from the air intake port to the air exhaust port, located at least a distance L/5 from the air intake port and air exhaust port.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 4A, 4B, 4C and 4D are side elevational diagrams illustrating some of the many different positions within the power supply that the air flow generator may be placed in accordance with various embodiments of the present invention.

DETAILED DESCRIPTION

Embodiments of a novel architecture for a power supply for providing power to an electronic device is described herein in the context of an enclosure for the power supply having improved airflow characteristics. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another. Moreover, it will be appreciated that such a development effort might be complex and time-consuming, but would nevertheless be a routine undertaking of engineering for those of ordinary skill in the art having the benefit of this disclosure. In accordance with the present invention, the components or structures may be implemented using various types of items.

Figure 1:
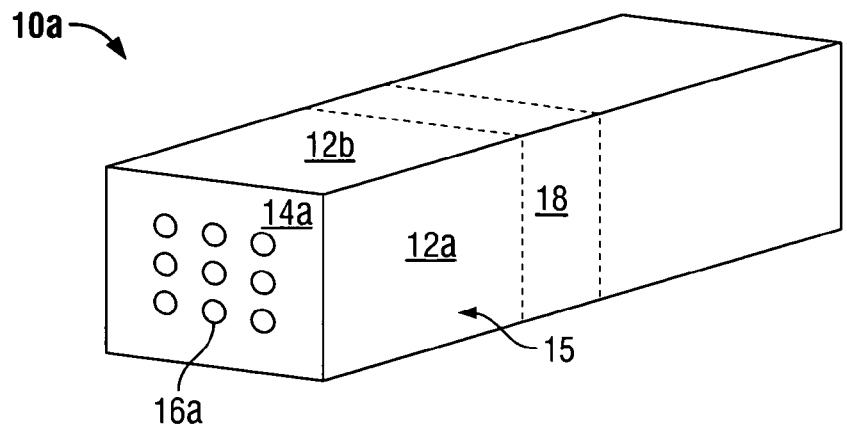
FIG. 1 is a front perspective view of a power supply in accordance with an embodiment of the present invention.
Figure 2:
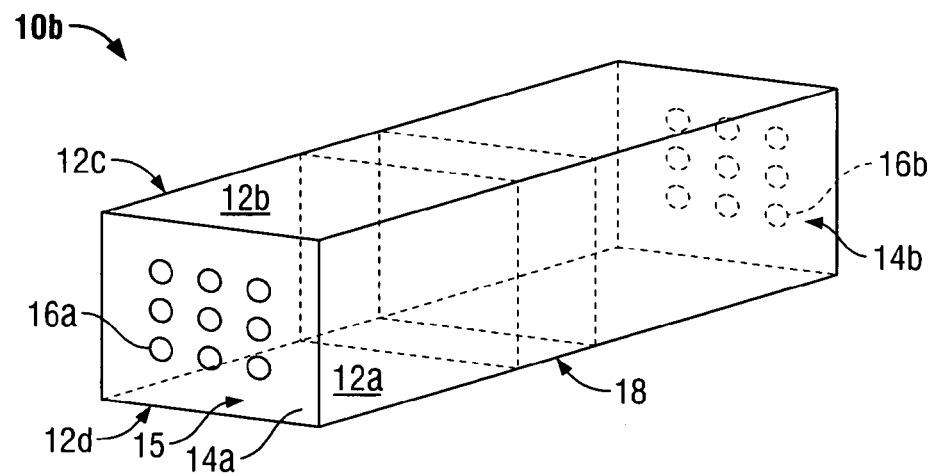
FIG. 2 is a front perspective cutaway view of a power supply in accordance with an embodiment of the present invention.
Figure 3:
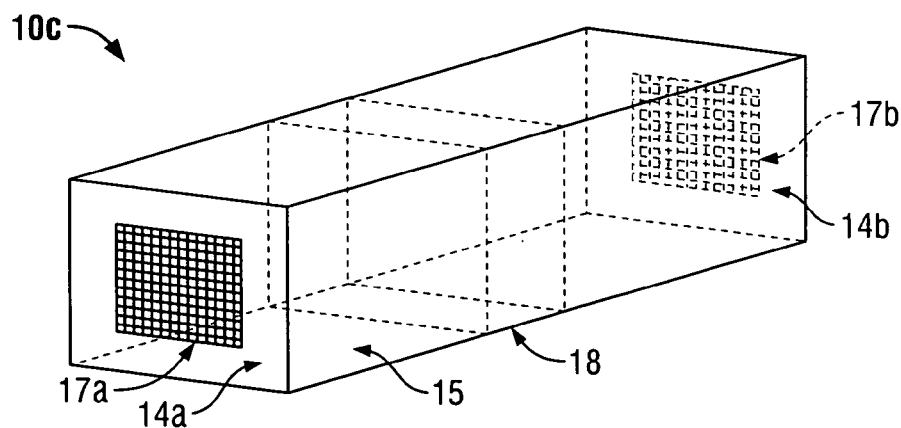
FIG. 3 is a front perspective cutaway view of a power supply in accordance with an embodiment of the present invention.

FIG. 1 is a front perspective view of a power supply such as a switch mode power supply a conventional linear power supply or any other power supply in accordance with an embodiment of the present invention. FIG. 2 is a front perspective cutaway view of a power supply in accordance with an embodiment of the present invention. FIG. 3 is a front perspective cutaway view of a power supply in accordance with an embodiment of the present invention. In accordance with FIGS. 1 and 2 a power supply 10a has a plurality of sidewalls 12a, 12b, 12c and 12d, a first end wall 14a and a second end wall 14b which together form an enclosure 15. Enclosure 15 shields internal components from an external environment and contains a cooling air flow.

Disposed within the power supply (10a, 10b, 10c) is an air flow generator 18 such as a fan, pump, blower, or similar device for creating movement of air. Air flow generator 18 creates a local pressure differential between its input and output. This induces air from outside enclosure 15 to enter the low pressure side of the enclosure through an intake air vent (such as intake holes 16a or intake screen/vent or filter 17a) pass over components inside enclosure 15, through air flow generator 18, over more components and to exit the enclosure 15 through an exhaust air vent (such as exhaust holes 16b or exhaust screen, vent or filter 17b). In this way the air is heated and waste heat generated by components inside enclosure 15 is removed, thereby cooling the power supply (10a, 10b, 10c).

It should be noted that the air flow generator 18 is placed interior to the power supply (10a, 10b, 10c). Accordingly, while some airflow may be attenuated through kinetic loss, this loss in not nearly as much as if the air flow generator 18 had been placed in the proximate vicinity of one of the end walls 14a, 14b of the power supply (10a, 10b, 10c).

FIGS. 4A, 4B, 4C and 4D are side elevational diagrams illustrating some of the many different positions within the power supply in which the air flow generator 18 may be placed in accordance with various embodiments of the present invention. In one embodiment of the present invention, as shown in FIG. 4A, the air flow generator 18 is placed at approximately the midpoint of the length, L, of the enclosure 15 and power supply 10d.

In another case, shown in FIG. 4B, the air flow generator 18 may be placed approximately one-third of the way between the inflow and the outflow ends of the power supply 10e. In this embodiment, the air flux is greater at the inflow end, but the outflow end still has sufficient airflow flux for increased thermodynamic efficiency as opposed to the placement of the air flow generator 18 directly at the inflow end of the power supply 10e.

In yet another case, shown in FIG. 4C, the air flow generator 18 may be placed approximately two-thirds of the way between the inflow and the outflow ends of the power supply 10f. In this embodiment, the air flux is greater at the outflow end, but the inflow end still has sufficient airflow flux for increased thermodynamic efficiency as opposed to the placement of the air flow generator 18 directly at the outflow end of the power supply 10f.

FIG. 4D details the range of placement of the environmental flow mechanism within the power supply 10g. To contribute to increased thermodynamic efficiency relating to increased airflow at both ends, the air flow generator 18 can be typically placed between ⅕ and ⅘ of the length of the power supply 10g. In this manner, when the air flow generator 18 is placed in this range interior to the power supply 10g, an increased flow at both ends is produced due to a decreased kinetic loss or decreased one-way impedance produced by the components within the enclosure of the power supply 10g.

Figure 5:
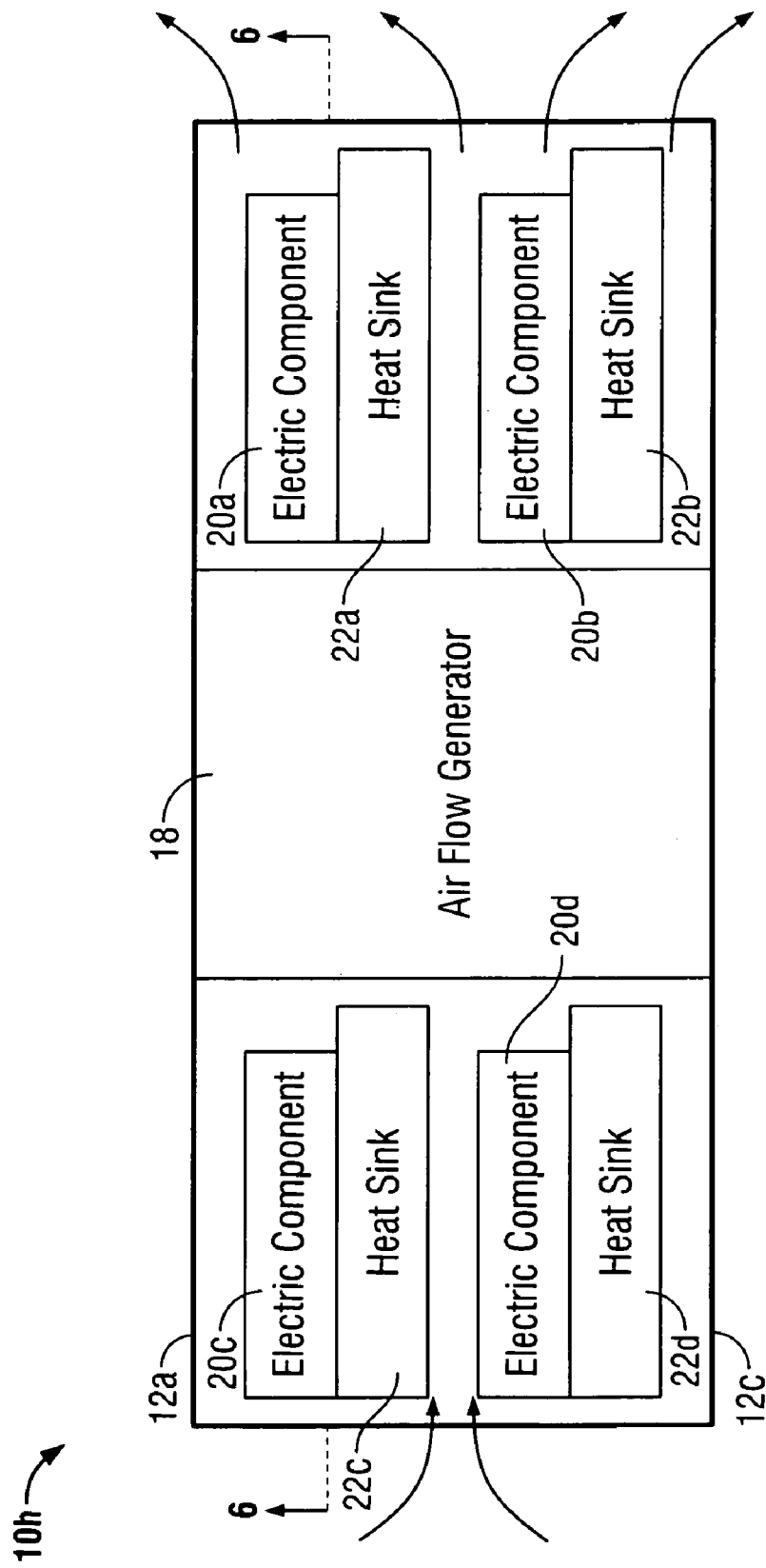
FIG. 5 is a top plan view in block form of a power supply in accordance with an embodiment of the present invention.

FIG. 5 is a top plan view in block form of a power supply in accordance with an embodiment of the present invention. A power supply 10h has an air flow generator 18 embedded within the structure of the power supply 10h. The air flow generator 18 creates an airflow within and through the power supply 10h.

A plurality of electric components 20a–d can be disposed within the housing or enclosure of the power supply 10h. Each of the electric components can generate excess waste heat. Any proportion of the electric components 20a–d can each be coupled to a cooling structure, such as the heat sinks depicted in items 22a–d. Each of the cooling structures 22a–d can conductively transfer heat from the respectively attached electric components 20a–d and can convectively transfer heat to the air flow.

The cooling structures 22a–d can be placed in the interior of the power supply 10 such that they are oriented along an axis of airflow. In one aspect, this axis can be defined by the end walls 14a, 14b of the power supply 10h. Accordingly, an airflow generated by the air flow generator 18 is efficiently distributed along the faces of the cooling structure, and produces an efficient heat transfer path from the electric component, to the cooling structure, to the airflow, and ultimately out to the external environment.

In one embodiment, the cooling structures 22a–d are oriented so that a minimal profile is projected perpendicular to the airflow axis of the power supply 10h. In this manner, the faces of the cooling structures produce a minimal flow impedance, which would result in a minimal pressure loss due to airflow impedances. Accordingly, higher differential pressures are generated at the ends of the power supply 10h where the airflows are introduced into or out of the body of the power supply 10h. With such a maximal pressure, larger airflows may be created by the air flow generator 18. The thermodynamic effect of the air flow generator 18 is thereby maximized for operation at a particular operational speed. Thus, a maximal cooling effect for the electric components 20*a–d* is performed by the combination of the internally mounted air flow generator 18 and the alignment of the cooling structures 22*a–d* relative to the longitudinal orientation of the power supply 10*h*. The cooling structures may be passive thermal heat sinks, or may be actively cooled structures (e.g., a semiconductor chip with an attached fan).

Figure 6:
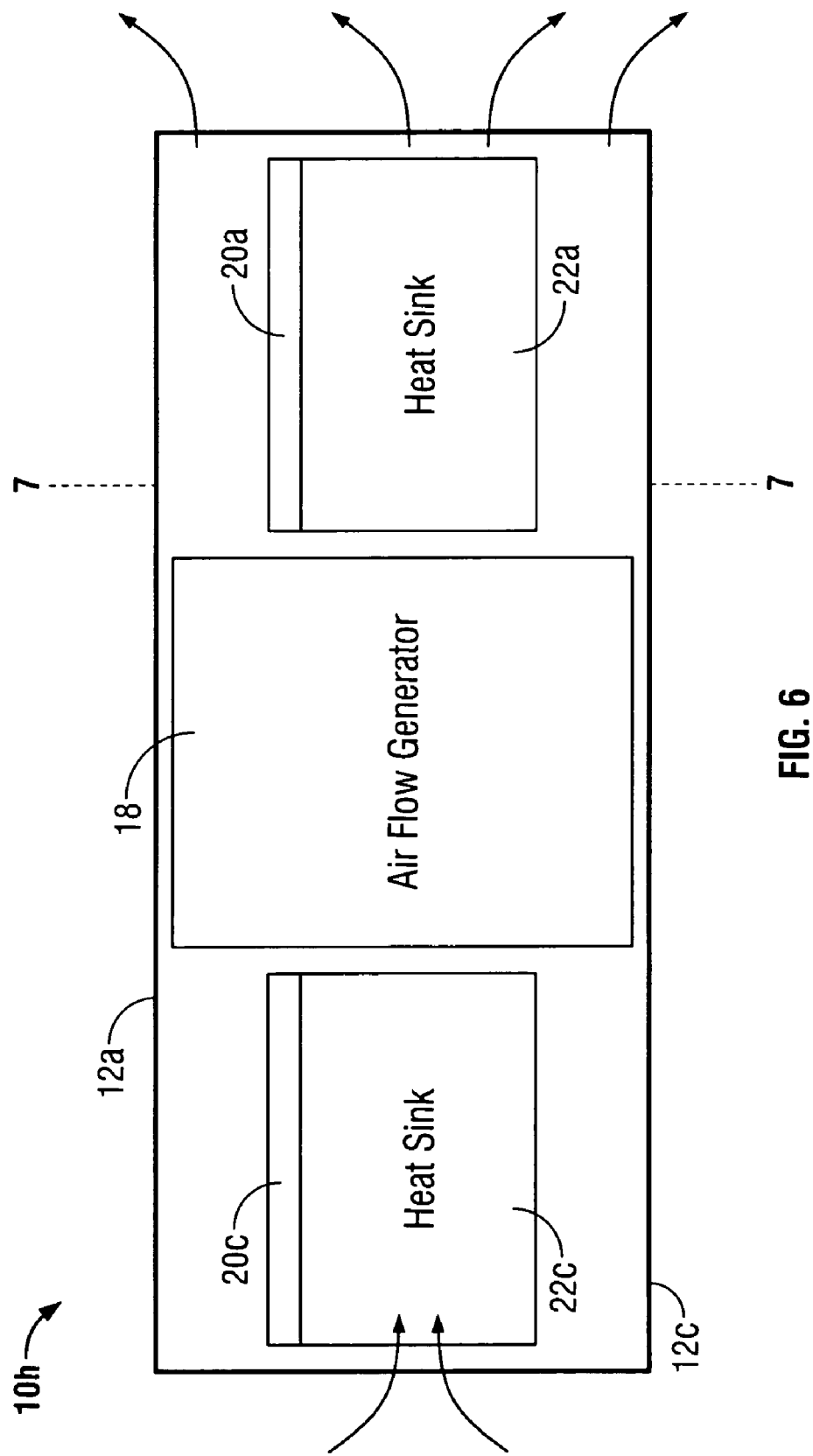
FIG. 6 is a side elevational view in block form of a power supply in accordance with an embodiment of the present invention.

FIG. 6 is a side elevational view in block form of a power supply in accordance with an embodiment of the present invention. Power supply 10*h* is like that depicted in FIG. 5. The power supply of FIG. 5 is shown in FIG. 6 along a airflow plane taken along line 6—6 of FIG. 5. In this embodiment, the maximal surface areas of the cooling structures 22*a–d* are oriented substantially parallel to the airflow orientation of the power supply 10*h*.

Figure 7:
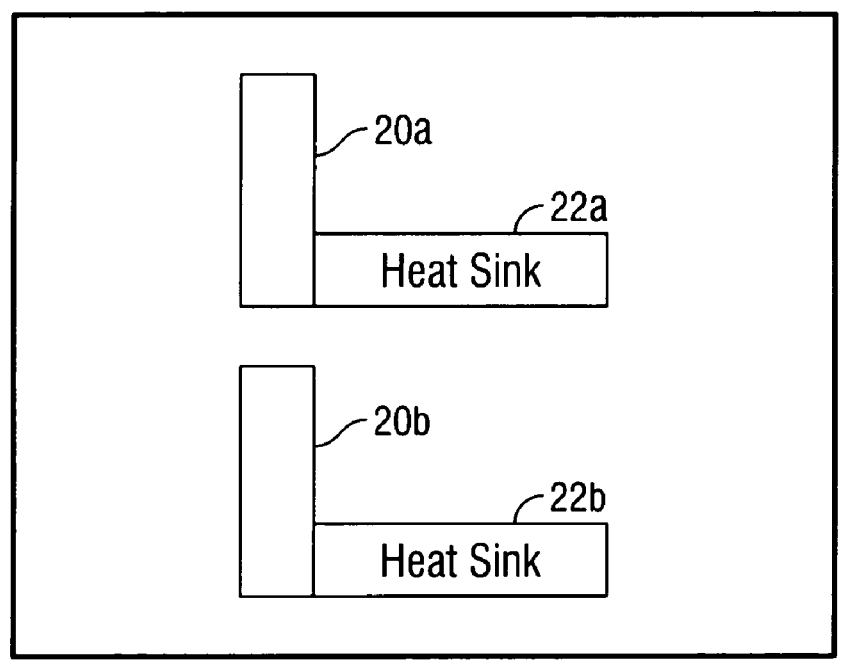
FIG. 7 is a top plan view in block form detailing a cross-sectional view taken along line 7—7 of the power supply depicted in FIG. 6.

FIG. 7 is a top plan view in block form detailing a cross-sectional view taken along line 7—7 of the power supply 10*h* depicted in FIG. 6. One should note that the areas of the faces of the cooling structures oriented substantially parallel to the cross sectional plane will typically be smaller than those of the faces oriented substantially parallel to the airflow axis of the power supply 10*h*.

Figure 8:
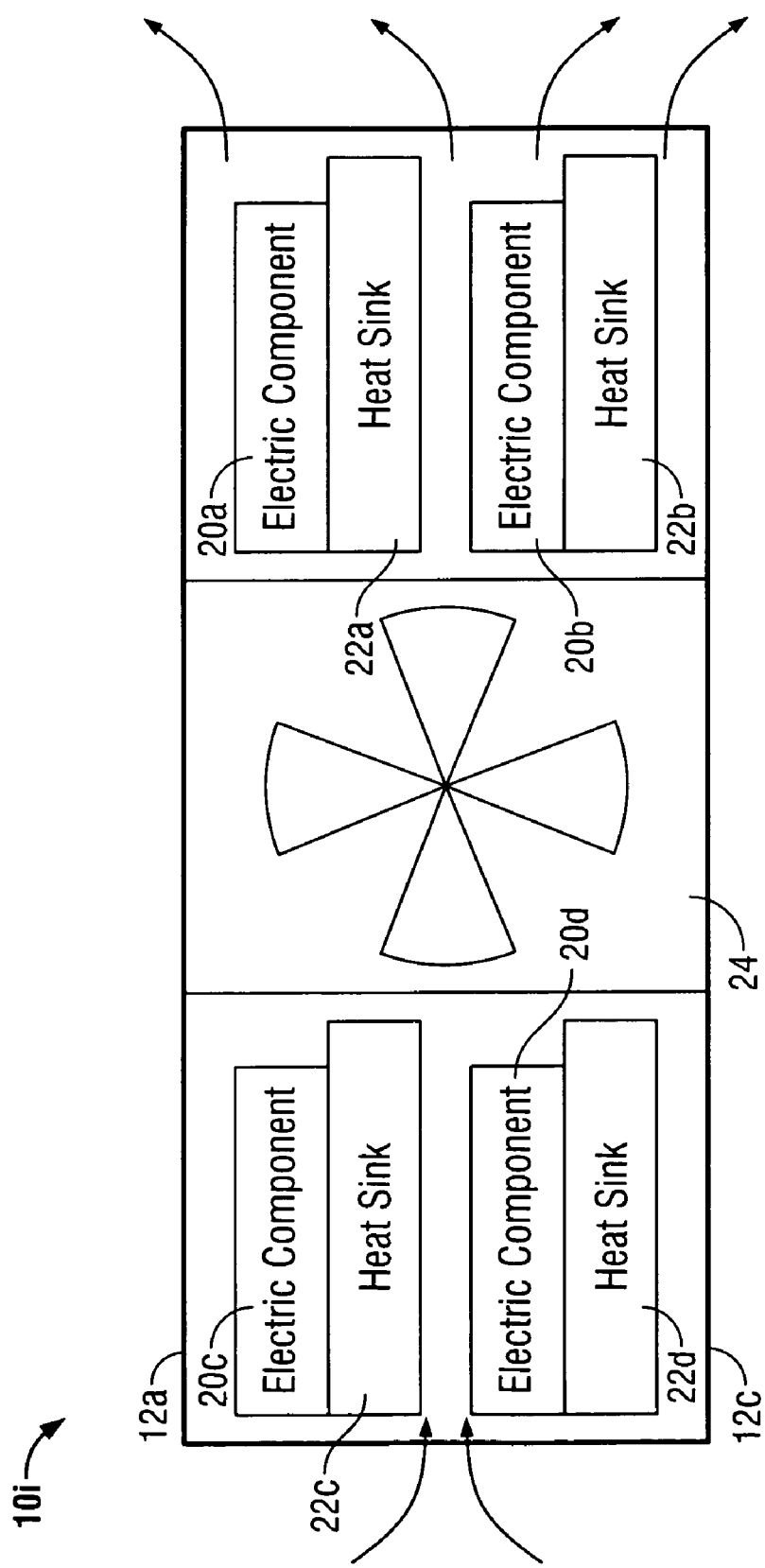
FIG. 8 is a top plan view in block form of a power supply in accordance with an embodiment of the present invention.

FIG. 8 is a top plan view in block form of a power supply in accordance with an embodiment of the present invention. A power supply 10*i* is depicted, and can contain many of the same features as noted as the one depicted in FIGS. 5, 6, and 7. In this case, the air flow generator can be construed as a fan 24. Other implementations of an air flow generator may now be envisioned by those of ordinary skill in the art, such as a blower or pump, among others. These other air flow generators should be thought as being contemplated for use by this disclosure.

Figure 9:
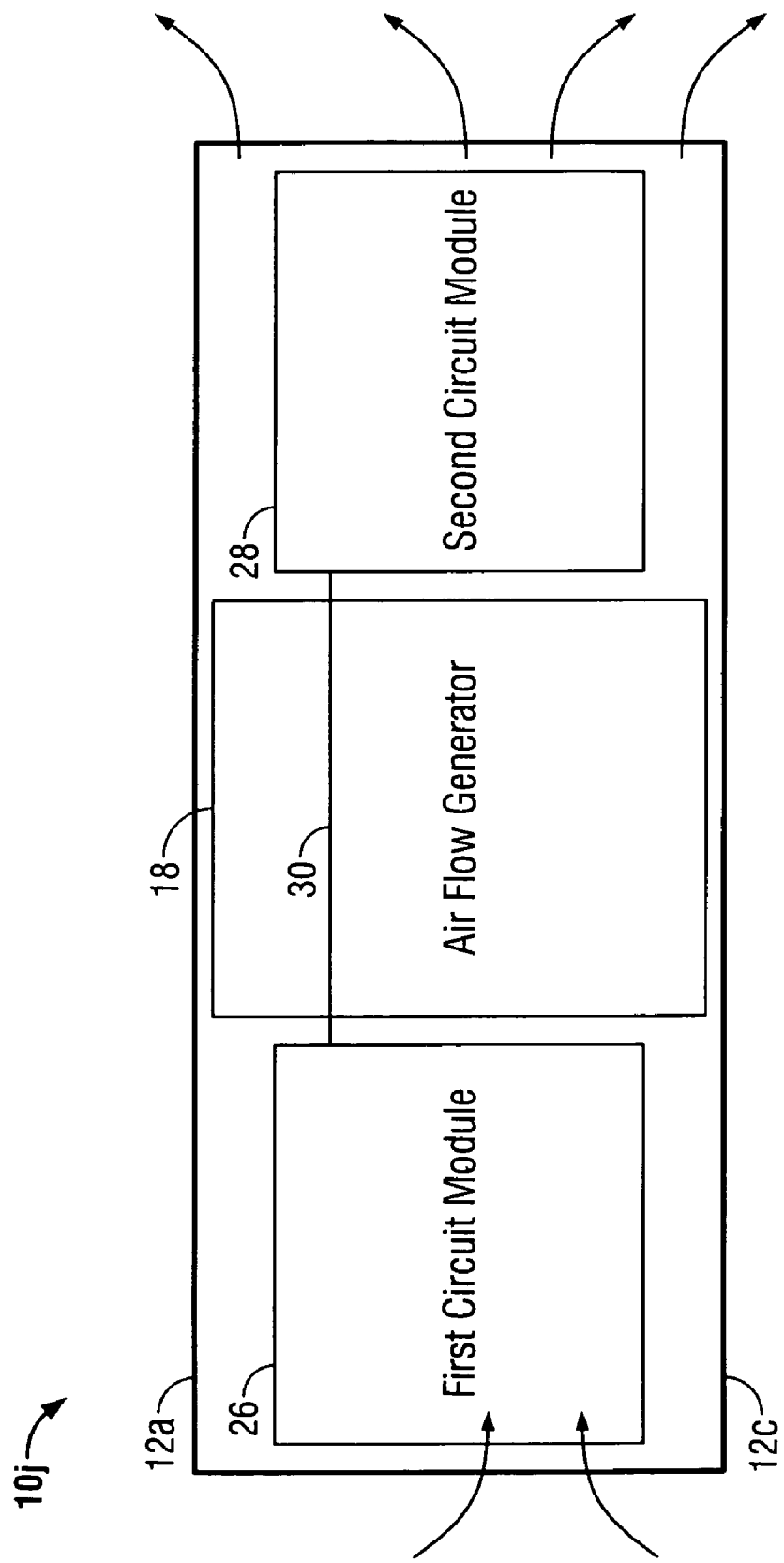
FIG. 9 is a top plan view in block form of a power supply in accordance with an embodiment of the present invention.

FIG. 9 is a top plan view in block form of a power supply in accordance with an embodiment of the present invention. A power supply 10*j* contains an environmental flow mechanism 18 disposed inside the body of the power supply 10*j*. A first circuit module 26 is disposed at one end of the power supply 10*j*, while a second circuit module 28 is disposed at the other. The air flow generator 18 is disposed between the first circuit module 26 and the second circuit module 28 within the power supply 10*j*.

Typically, a power supply used in computing applications contains an input to receive electrical power from an external alternating current (AC) source such as a main source. Accordingly, the incoming power can be clipped, rectified, inverted, and/or filtered to produce a constant, near constant, or demand driven voltage level. Typically, the components within the first circuit module 26 can be used to provide such a constant power supply or a primary section of a switched power supply. Typically, the components within the first circuit module 26 are shielded from the secondary section of the power supply, and are in contact with an input main power, such as an AC source.

The second circuit module 28 can be a secondary section of a switched power supply. A secondary section, in terms of a switched power supply, is typically an output section of an power supply which is isolated from the AC input.

Of course, the first circuit module 26 and the second circuit module 28 may be an AC-DC power unit, an AC—AC power unit, a DC-AC power unit, or a DC—DC type power unit. Those of ordinary skill in the art will now recognize that each of these units has some electrical isolation associated with portions of the circuitry used in the conversion from an input source to an output source.

One or more lines 30 couples the output of the first circuit module 26 to an input of the second circuit module 28. In this manner, line(s) 30 couples the first circuit module 26 and the second circuit module 28 by traversing a region of space in the power supply 10*j* substantially occupied solely by the air flow generator 18. Thus, the placement of the air flow generator 18 can also be used to effectuate a clearer electrical isolation between the first circuit module 26 and second circuit module 28, wherein radio frequency (RF) or other electromagnetic interference exchanged between the functioning first circuit module 26 and the functioning second circuit module 28 is reduced. In this manner, the placement of the air flow generator 18 between the first circuit module 26 and second circuit module 28 results in a cleaner operation of the power supply 10*j* in the electromagnetic sense.

Figure 10:
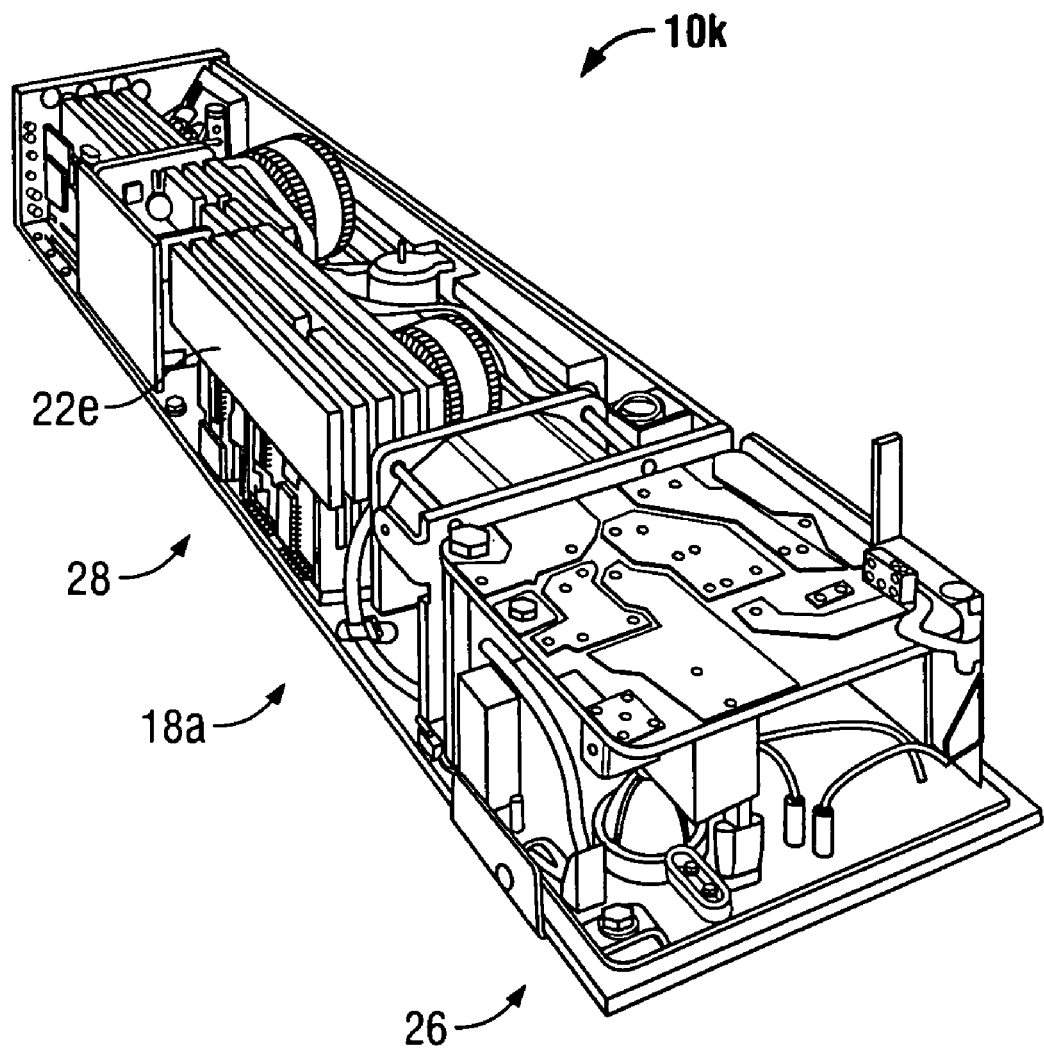
FIG. 10 is a front perspective drawing showing the detailed structure of a power supply in accordance with the present invention.

FIG. 10 is a front perspective drawing showing the detailed structure of a power supply in accordance with an embodiment of the present invention. A power supply 10*k* has an air flow generator 18*a* that creates an air flow throughout the power supply 10*k*. The air flow generator 18*a* is disposed between a first circuit 26 and a second circuit 28*a* 28. Cooling structures 22*e* are disposed within the power supply 10*k*. The cooling structures 22*e* are thermally coupled to the various heat-producing components within the power supply 10*k*.

The cooling structures typically have a "flow" face (generally parallel to the flow of the air created by the air flow generator 18) and an "impedance" face (generally perpendicular to the flow of air and creating a higher flow impedance than the "flow" face). In one aspect of the invention, the combined areas of the impedance faces are dominated by the combined areas of the flow faces. In such a power supply, the combined areas of the flow faces can be four times higher, or greater, than the combined areas of the impedance faces of the cooling structures.

Figure 11:
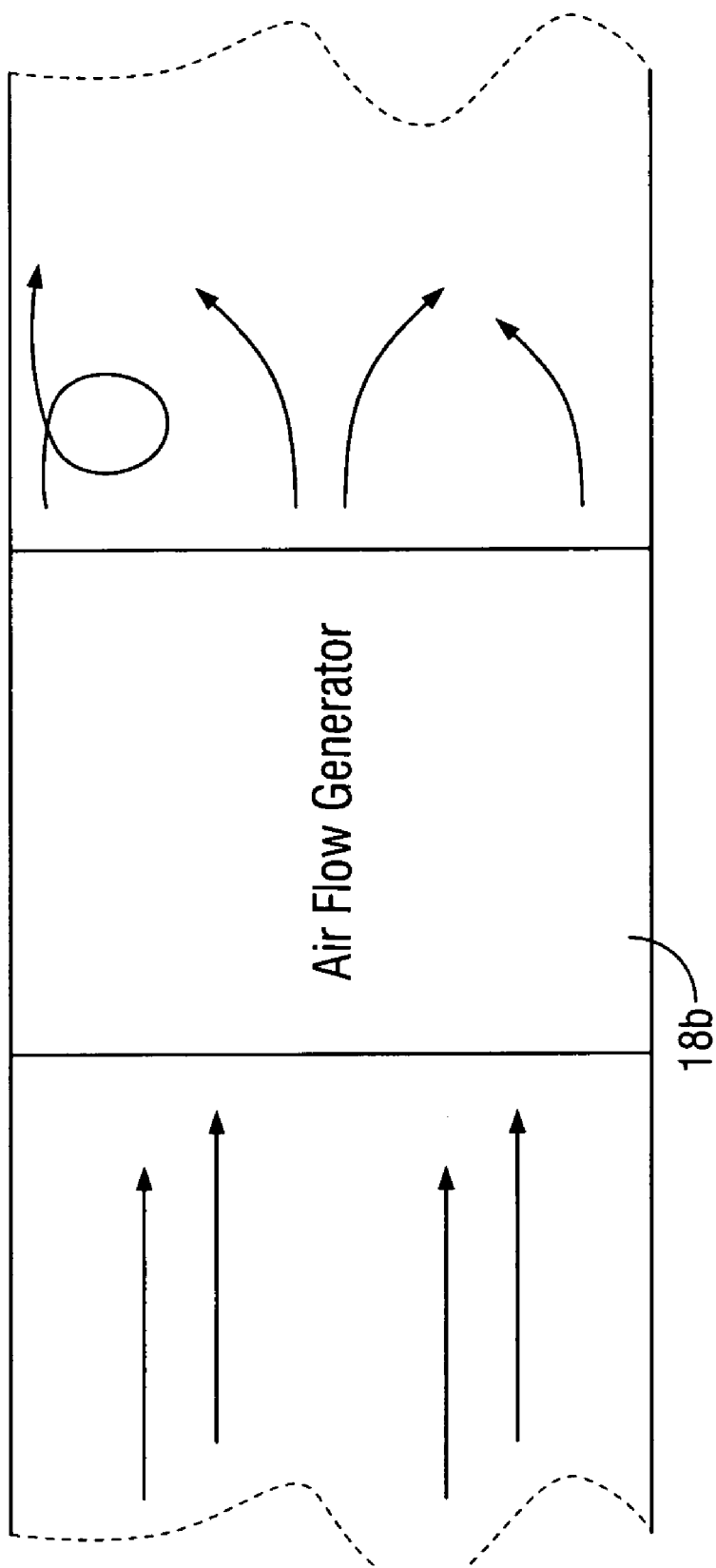
FIG. 11 is a sectional diagram of a power supply in accordance with an embodiment of the present invention.

FIG. 11 is a sectional diagram of a power supply in accordance with an embodiment of the present invention. A power supply 10*k* has an air flow generator 18*b* that creates an air flow throughout the power supply 10*k*. The air flow generator 18*b* of this embodiment creates an approximately smooth flow at the entrance to the air flow generator 18*b* and can introduce a turbulence into the flow flowing away from the air flow generator 18*b*.

Figure 12:
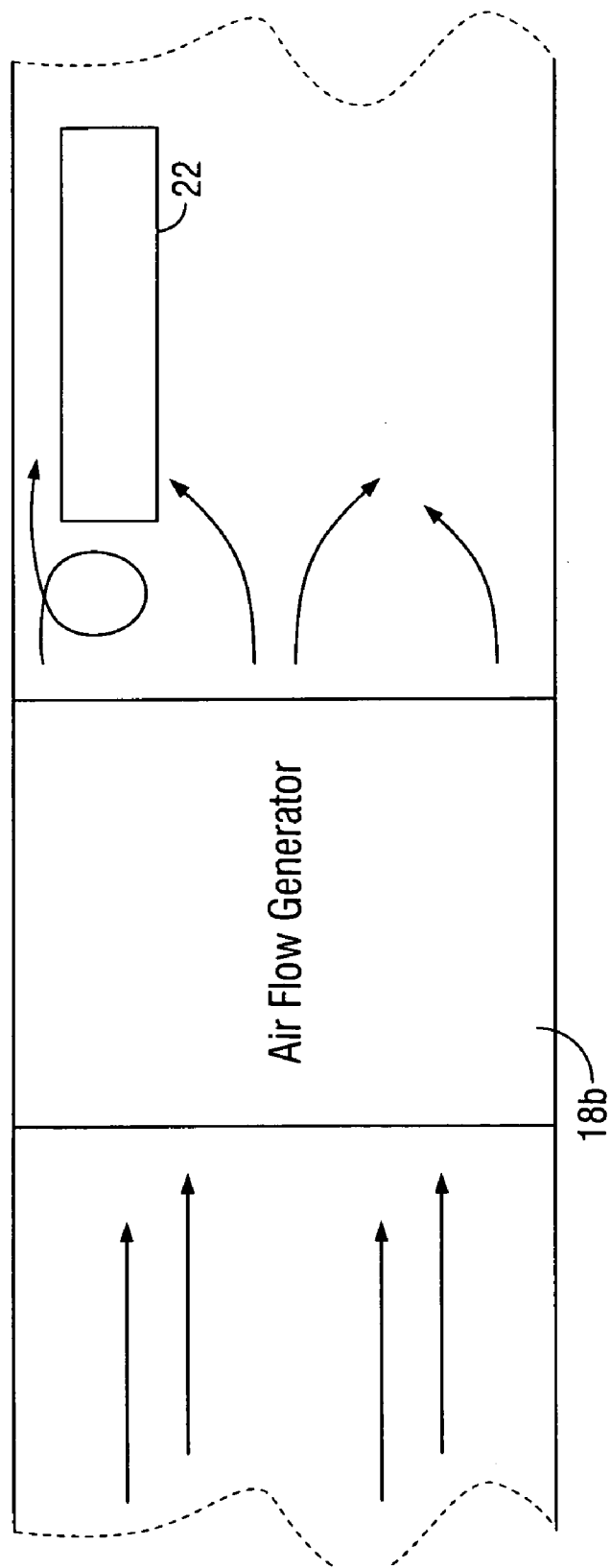
FIG. 12 is a sectional diagram of a power supply in accordance with an embodiment of the present invention.

FIG. 12 is a sectional diagram of a power supply in accordance with an embodiment of the present invention. A power supply has an air flow generator 18*b* that creates an air flow throughout the power supply. Like that depicted above in relation to FIG. 12, the air flow generator of this embodiment creates an approximately smooth flow at the entrance to the air flow generator 18*b* and introduces turbulence into the flow exiting the air flow generator 18*b*. In FIG. 12, the turbulent flow works in conjunction with the cooling structure 22. The turbulence introduced into the exiting flow is directed into the cooling face of the cooling structure 22. This allows for a greater heat exchange to occur in the system.

Accordingly, a novel architecture for a power supply for providing power to an electronic device has been described and illustrated. Those of ordinary skill in the art having the benefit of this disclosure will now recognize that many more modifications and variations of the present invention than mentioned above are possible without departing from the inventive concepts disclosed herein. Of course, the various features depicted in each of the figures and the accompanying text may be combined together. Accordingly, it should be clearly understood that the present invention is not intended to be limited by the particular features specifically described and illustrated in the specification and drawings, but the concept of the present invention is to be measured by the scope of the appended claims. It should be understood that various changes, substitutions, and alterations could be made hereto without departing from the spirit and scope of the invention as described by the appended claims that follow. The invention, therefore, is not to be restricted except in the spirit of the appended claims.

Accordingly, what is claimed is:

1. A power supply comprising:
   an enclosure of length L;
   a first end wall disposed at a first end of said enclosure and a second end wall disposed at a second end of said enclosure;
   an air permeable air intake port in said first end wall;
   an air permeable air exhaust port in said second end wall;
   an air flow generator disposed within said enclosure at least a distance L/5 from said air intake port and said air exhaust port, wherein said first end wall and said second end wall define a longitudinal axis of said enclosure;
   a first electrical circuit disposed in said enclosure between said air intake port and said air flow generator;
   a second electrical circuit disposed in said enclosure between said air exhaust port and said air flow generator;
   a first cooling structure, thermally coupled to said first electrical circuit, having a first face substantially parallel to said longitudinal axis and a second face substantially perpendicular to said longitudinal axis; and
   wherein the area of said second face is less than area of said first face.

2. The power supply of claim 1, wherein said first electrical circuit is a primary circuit of a power supply.

3. The power supply of claim 1, wherein said first electrical circuit is a primary circuit operable to be coupled to an alternating current power source.

4. A power supply comprising:
   an enclosure of length L;
   a first end wall disposed at a first end of said enclosure and a second end wall disposed at a second end of said enclosure;
   an air permeable air intake port in said first end wall;
   an air permeable air exhaust port in said second end wall;
   an air flow generator disposed within said enclosure at least a distance L/5 from said air intake port and said air exhaust port, wherein said first end wall and said second end wall define a longitudinal axis of said enclosure;
   a first electrical circuit disposed in said enclosure between said air intake port and said air flow generator;
   a second electrical circuit disposed in said enclosure between said air exhaust port and said air flow generator;
   a first cooling structure, thermally coupled to said second electrical circuit, having a first face substantially parallel to said longitudinal axis and a second face substantially perpendicular to said longitudinal axis; and
   wherein the area of said second face is less than area of said first face.

5. The power supply of claim 4, further comprising:
   a second cooling structure, thermally coupled to said first electrical circuit, having a third face substantially parallel to said airflow axis and a fourth face substantially perpendicular to said airflow axis; and
   wherein the area of said fourth face is less than the area of said third face.

6. A power supply comprising:
   an enclosure of length L;
   a first end wall disposed at a first end of said enclosure and a second end wall disposed at a second end of said enclosure;
   an air permeable air intake port in said first end wall;
   an air permeable air exhaust port in said second end wall;
   an air flow generator disposed within said enclosure at least a distance L/5 from said air intake port and said air exhaust port, wherein said first end wall and said second end wall define a longitudinal axis of said enclosure
   a first electrical circuit disposed in said enclosure between said air intake port and said air flow generator;
   a second electrical circuit disposed in said enclosure between said air exhaust port and said air flow generator;
   a plurality of cooling structures, thermally coupled to either said first electrical circuit or said second electrical circuit, each of said plurality of cooling structures having a plurality of faces, including a flow face and an impedance face, wherein the summation of the area of the flow faces of the plurality of cooling structures is greater than the summation of the impedance faces of the plurality of cooling structures.

7. A method of operating a power supply, the power supply, the method comprising:
   providing a power supply having an enclosure having an interior and a length (L), the enclosure having first and second end walls, the end walls defining a longitudinal axis of the enclosure, the first end wall having an air intake port disposed within it, the second end wall having an air exhaust port disposed within it, first and second electrical circuits within the enclosure, a first cooling structure within the enclosure thermally coupled to the first or second electrical circuit, the first cooling structure having a first face substantially parallel to said longitudinal axis and a second face substantially perpendicular to said longitudinal axis, wherein the area of said second face is less than area of said first face;
   coupling the first electrical circuit to a source of input power;
   transforming, within the first electrical circuit, the input power to an intermediate electrical energy;
   transforming the intermediate electrical energy into an output electrical energy in the second electrical circuit;
   creating an air flow with an air flow generator disposed within the enclosure between said first circuit and said second circuit and no closer than L/5 to either of said first and second end walls, said air flow flowing from the exterior of said enclosure, in said air intake port, through said enclosure, and out said air exhaust port.

8. A power supply comprising:
   an enclosure having an interior and a length (L), said enclosure comprising:
   a first and a second end wall;
   an air intake port disposed in said first end wall;
   an air exhaust port disposed in said second end wall;
   wherein said first and second end walls enclose an airflow axis of said enclosure;
   an air flow generator, disposed within an interior of said enclosure and operable to create an air flow from the exterior of said enclosure, into said air intake port through said enclosure, out of said air exhaust port, and outwards to the exterior;

a first electrical circuit disposed within said enclosure that is operable to couple to an exterior power source and transform an input power into an intermediate power signal;

a second electrical circuit, disposed within said enclosure and coupled to said first circuit, that is operable to receive said intermediate power signal and provide an output power, said second circuit separated from first circuit by a separation volume, said operation of second circuit shielded from operating characteristics of first circuit;

said air flow generator disposed within said separation volume;

a first cooling structure, thermally coupled to said first electrical circuit, having a first face substantially parallel to said airflow axis and a second face substantially perpendicular to said airflow axis; and wherein the total area of said second face is less than a total area of said first face.

9. The power supply of claim 8, wherein said first electrical circuit is a primary stage of a power supply.

10. The power supply of claim 8, wherein said air flow generator is disposed within said enclosure so that it is no nearer to either of said first and second end walls than a dimension measuring L/5.

11. A power supply comprising:
an enclosure having an interior and a length (L), said enclosure comprising:
a first and a second end wall;
an air intake port disposed in said first end wall;
an air exhaust port disposed in said second end wall;
wherein said first and second end walls enclose an airflow axis of said enclosure;
an air flow generator, disposed within an interior of said enclosure and operable to create an air flow from the exterior of said enclosure, into said air intake port through said enclosure, out of said air exhaust port, and outwards to the exterior;
a first electrical circuit disposed within said enclosure that is operable to couple to an exterior power source and transform an input power into an intermediate power signal;
a second electrical circuit, disposed within said enclosure and coupled to said first circuit, that is operable to receive said intermediate power signal and provide an output power, said second circuit separated from first circuit by a separation volume, said operation of second circuit shielded from operating characteristics of first circuit;
said air flow generator disposed within said separation volume;
a first cooling structure, thermally coupled to said second electrical circuit, having a first face substantially parallel to said airflow axis and a second face substantially perpendicular to said airflow axis; and
wherein a total area of said second face is less than a total area of said first face.

12. The power supply of claim 11, further comprising:
a second cooling structure, thermally coupled to said first electrical circuit, having a third face substantially parallel to said airflow axis and a fourth face substantially perpendicular to said airflow axis; and
wherein a total area of said fourth face is less than a total area of said third face.

13. A power supply comprising:
an enclosure having an interior and a length (L), said enclosure comprising:
a first and a second end wall;
an air intake port disposed in said first end wall;
an air exhaust port disposed in said second end wall;
wherein said first and second end walls enclose an airflow axis of said enclosure;
an air flow generator, disposed within an interior of said enclosure and operable to create an air flow from the exterior of said enclosure, into said air intake port through said enclosure, out of said air exhaust port, and outwards to the exterior;
a first electrical circuit disposed within said enclosure that is operable to couple to an exterior power source and transform an input power into an intermediate power signal;
a second electrical circuit, disposed within said enclosure and coupled to said first circuit, that is operable to receive said intermediate power signal and provide an output power, said second circuit separated from first circuit by a separation volume, said operation of second circuit shielded from operating characteristics of first circuit;
said air flow generator disposed within said separation volume;
a plurality of cooling structures, thermally coupled to either said first electrical circuit or said second electrical circuit, each of said plurality of cooling structures having a plurality of faces, including a flow face and an impedance face, wherein the summation of the area of the flow faces of the plurality of cooling structures is greater than the summation of the impedance faces of the plurality of cooling structures.

14. An electrical apparatus comprising:
an enclosure of length L;
a first end wall disposed at a first end of said enclosure and a second end wall disposed at a second end of said enclosure;
an air permeable air intake port in said first end wall;
an air permeable air exhaust port in said second end wall;
an air flow generator disposed within said enclosure at least a distance L/5 from said air intake port and said air exhaust port, wherein said first end wall and said second end wall define a longitudinal axis of said enclosure;
a first electrical circuit disposed in said enclosure between said air intake port and said air flow generator;
a second electrical circuit disposed in said enclosure between said air exhaust port and said air flow generator;
a first cooling structure, thermally coupled to said first electrical circuit or said second electrical circuit, having a first face substantially parallel to said longitudinal axis and a second face substantially perpendicular to said longitudinal axis; and
wherein the area of said second face is less than area of said first face.

15. The electrical apparatus of claim 14, wherein the first cooling structure is thermally coupled to said second electrical circuit.

16. The electrical apparatus of claim 14, wherein the first cooling structure is thermally coupled to said first electrical circuit.

17. The electrical apparatus of claim 14, further comprising:
- a second cooling structure, thermally coupled to said second electrical circuit, having a third face substantially parallel to said airflow axis and a fourth face substantially perpendicular to said airflow axis; and
- wherein a total area of said fourth face is less than a total area of said third face.

18. The electrical apparatus of claim 17, wherein the electrical apparatus is a power supply.

19. The electrical apparatus of claim 14, wherein the electrical apparatus is a power supply.

20. The electrical apparatus of claim 14, wherein the an air flow generator disposed within said enclosure at least a distance L/3 from said air intake port and said air exhaust port.

21. The electrical apparatus of claim 20, wherein the electrical apparatus is a power supply.

* * * * *